United States Patent Office 3,021,303
Patented Feb. 13, 1962

3,021,303
HEAT STABILIZATION OF POLYCARBONATES
Bart Paul Jibben, Arnhem, Netherlands, assignor to N. V. Onderzoekingsinstituut Research, Arnhem, Netherlands, a corporation of the Netherlands
No Drawing. Filed Mar. 23, 1960, Ser. No. 16,909
Claims priority, application Netherlands Apr. 10, 1959
14 Claims. (Cl. 260—45.75)

This invention relates generally to polycarbonates, and more particularly to the stabilization of polycarbonates against degradative effects of heat.

These polycarbonates are prepared by known methods from the reaction of organic dihydroxy compounds and phosgene and/or chlorocarbonic acid esters of organic dihydroxy compounds. Some of these polycarbonates are prepared by the process described in U.S. Patent No. 2,989,503 owned by the common assignee. Polycarbonates may be obtained powdered or granular form and as such are formed into fibers, films or other articles by extruding or injection molding the molten polymer.

The heating of the polymers has heretofore resulted in many cases in a severe discoloration of the final product. This discoloration is, of course, undesirable in certain applications, such as fibers, films or other articles.

It is therefore an object of this invention to provide a polycarbonate that is stabilized against the degradative effects of heat.

It is a further object of this invention to provide a process for stabilizing high molecular weight polycarbonates against the degradative effects of heat.

These and other objects of this invention will become apparent from the following detailed description.

The objects of this invention are accomplished by the addition to the polycarbonates of a small amount of a silicate of an element selected from the group consisting of lead, zinc, and elements of groups I and II of the periodic system having an electronegativity of not more than 1.0.

The amount of the stabilizer will vary depending upon the polycarbonate that is used. Such amounts are relatively simple to determine by experimentation. For example, very small amounts of the stabilizer are added to the polycarbonate and the amount is increased until the desired degree of stabilization against the degradative effects of heat is obtained. Normally less than 0.001% by weight based on the weight of the polycarbonate will not exert any stabilizing effect, and more than 3.0% by weight will not result in any substantial increase in the degree of stabilization. In addition, more than 3.0% by weight would be uneconomical.

These stabilizers may be added to the polycarbonate in several ways. For instance, powdered or granular polycarbonates may be mixed with the stabilizer after which the mixture is molded into the desired product by extrusion or injection molding. In addition, the stabilizer may be added to solutions of the polycarbonates and also to the molten polycarbonates.

The stabilizers of this invention are insoluble in the polycarbonates. Thus, the products produced from the stabilized polycarbonates will have a dull or delustered appearance which in itself is an improvement in the appearance of the products. However, the stabilization against the degradative effects of heat is not the result of this delustering.

If an object manufactured from the stabilized polycarbonate is dissolved and the resulting solution is filtered, it will have a color substantially equal to that of a filtered solution of the original and unprocessed polycarbonate. However, if the unstabilized polycarbonate is processed into the finished product and then dissolved and filtered, it will have a distinct discoloration when compared to both the stabilized polycarbonate and the original and unprocessed polycarbonate.

As pointed out above, the stabilizers of this invention are silicates of lead, zinc, and elements of groups I and II of the periodic system having an electronegativity of not more than 1.0. The elements that fall within the definition are lithium, sodium, potassium, rubidium, caseium, calcium, strontium, and barium. The electronegativity values for many elements and the definition of such may be found in Pauling, "The Nature of the Chemical Bond," Cornell University Press, Second Edition, 1945, at pages 62–65.

The methods of preparation of the high molecular weight polycarbonates capable of being stabilized by this invention are well known. See, for example, the processes disclosed by U.S. application Serial No. 809,345. In that application, a method is described whereby an organic dihydroxy compound is reacted with phosgene or chlorocarbonic acid esters of organic dihydroxy compounds in the presence of dichloromethane, trichloromethane, or mixtures thereof. The polycarbonate is then formed in solution in the dichloromethane, etc., after which the solvent is evaporated and the polycarbonate is obtained in powdered form. The application also discloses a process whereby the polycarbonate solution is mixed with water and dimethylbenzene and then evaporated. It is possible to use other methods to prepare the polycarbonates without departing from the spirit and scope of this invention.

The organic dihydroxy compounds which may be used may be aromatic, aliphatic, or cycloaliphatic dihydroxy compounds. Also, the aromatic dihydroxy compounds may be reacted with formaldehyde before or during the preparation of the polycarbonates.

Examples of the aromatic compounds are: di-(monohydroxy aryl) alkanes, di-(monohydroxy aryl) sulfones, di-(monohydroxy aryl) ethers, and di-(monohydroxy aryl) thioethers. The above aryl radicals may be the same or different and, in addition, they may have substituents, such as halogens and/or alkyl radicals. The radical linking the benzene rings may be alkyl, cycloalkyl or aryl.

Representative of these aromatic dihydroxy compounds are:

(4,4'-dihydroxydiphenyl) methane;
2,2-(4,4'-dihydroxydiphenyl) propane;
1,1-(4,4'-dihydroxy 3,3'-dimethyldiphenyl) cyclohexane;
2,2-(2,2'-dihydroxy 4,4'-ditertiarybutyldiphenyl) propane;
1,1-(4,4'-dihydroxydiphenyl) 1-phenylethane;
2,2-(4,4' - dihydroxy 3,3',5,5' - tetrachlorodiphenyl) propane;
4,4'-dihydroxydiphenyl sulphone;
4,4'-dihydroxy 3,3'-dimethyldiphenyl sulphone;
2,2'-dihydroxy 1,1'-dinaphthyl sulphone;
4,4'-dihydroxydiphenyl ether;
4,4'-dihydroxy 3,3'-dimethyldiphenyl ether;
4,4'-dihydroxydiphenyl thioether, and
4,4'-dihydroxy 2,2'-dimethyldiphenyl thioether.

Examples of other aromatic dihydroxy compounds are: hydroquinone; resorcinol; pyrocatechol; 2,4'-dihydroxydiphenol; 2,2'-dihydroxy diphenol; 1,4-dihydroxy naphthalene; 1,6-dihydroxy naphthalene; 2,6-dihydroxy naphthalene; 1,2-dihydroxy naphthalene; 1,5-dihydroxy anthracene, and 2,2'-dihydroxy dinaphthol-1,1'.

Examples of aliphatic and cycloaliphatic dihydroxy compounds are: ethylene glycol; diethylene glycol; triethylene glycol; polyethylene glycol; thiodiglycol; ethylene dithiodiglycol; propanediol-1,2 and the di- and polyglycols prepared from propylene oxide-1,2; propanediol-1,3; butanediol-1,3; butanediol-1,4; 2-methyl propanediol-1,3; pentanediol-1,5; hexanediol-1,6; octanediol-1,8; decanediol-1,10; cyclohexanediol-1,2; 2,2-(4,4'-dihydroxy dicyclohexyl)propane and 2,6-dihydroxy decahydronaphthalene.

The chlorocarbonic acid esters of organic dihydroxy compounds that are used in the preparation of the above polycarbonates may be any chlorocarbonic acid ester of the above-described organic dihydroxy compounds.

The following specific examples are offered as descriptive of this invention. They were selected merely for the purpose of illustration, and it should be understood that they are not to be considered as limiting this invention.

*Example I*

A powdered polycarbonate was prepared from 2,2-(4,4'-dihydroxydiphenyl) propane and the bischlorocarbonic acid ester of 2,2-(4,4'-dihydroxydiphenyl) propane. The polycarbonate powder was mixed with 0.3% by weight of zinc silicate and extruded into a thin rod by a conventional extruder. One portion of this rod was dissolved in methylene chloride to a 5% solution. After filtration, the filtrate exhibited an extinction of 0.18 at a wave length of 4000 A. in a cell of 10 cm. length.

The same polycarbonate without the addition of zinc silicate was processed in the same manner into thin rod. A 5% solution of this rod in methylene chloride exhibited an extinction of 0.38 at 4000 A. in a cell of 10. cm.

*Example II*

A polycarbonate in powdered form which had been prepared from 4,4'-dihydroxy diphenyl ether and phosgene was mixed with 0.8% by weight of zinc silicate. The mixture was pressed into a small block in a press heated at 250° C. The block had a light brown color. The polycarbonate in powdered form without the addition of zinc silicate was pressed into a small block in the same manner and the block exhibited a dark brown color.

*Example III*

A 20% solution in methylene chloride of a polycarbonate prepared from 2,2-(4,4'-dihydroxydiphenyl) propane and phosgene was partially mixed with 0.6% by weight of lead silicate calculated on the polycarbonate. The polymer was precipitated from the solution with methanol. The precipitate was filtered off, washed and dried and compressed into tablets. The tablets were processed into combs by a conventional injection molding machine. The combs had a light brown color. One of the combs so obtained was dissolved in methylene chloride to a 6% solution. This solution was slightly turbid because of undissolved lead silicate. After the lead silicate had been removed by filtration, the solution had an extinction of 0.24 at a wave length of 4000 A. in a cell of 10 cm. length. A 6% solution in methylene chloride of the tablets used as a starting material in the injection molding also showed an extinction of 0.24 measured under the same conditions.

Another portion of the 20% polycarbonate solution in methylene chloride was processed without adding lead silicate. The resulting polycarbonate was processed into combs in the same manner as mentioned above. These combs had a dark brown color. One of the combs so obtained was dissolved in methylene chloride to a 6% solution. This solution exhibited, measured in a cell with a length of 10 cm., an extinction of 0.44 at a wave length of 4000 A.

*Example IV*

A polycarbonate in powdered form which had been prepared from 2,2-(4,4'-dihydroxy 3,3',5,5'-tetrachloro diphenyl) propane and phosgene was mixed with 1.5% by weight of lead silicate. The mixture was extruded into a ribbon. This ribbon had a yellowish brown color.

The polycarbonate in powdered form without the addition of lead silicate was also extruded into a ribbon. This ribbon had a dark brown color.

*Example V*

A polycarbonate in powdered form, prepared from phosgene and a mixture of equimolecular proportions of hydroquinone and ethylene glycol, was mixed with 1% by weight of lead silicate. The mixture was pressed into a small block in a press heated at a temperature of 245° C.

The polycarbonate in powdered form without the addition of lead silicate was pressed into a small block in the same manner. The resulting block had a darker color than the block pressed from the polycarbonate mixed with lead silicate.

*Example VI*

A polycarbonate in powdered form which had been prepared from 2,2-(4,4'-dihydroxydiphenyl) propane and phosgene was mixed with 0.4% by weight of calcium silicate. The mixture was compressed into tablets. These tablets were processed into small rods by a conventional injection molding machine. One of these rods was dissolved in methylene chloride to a 6% solution, which was turbid because of undissolved calcium silicate. After removal of the calcium silicate by filtration, the solution showed an extinction of 0.29 at 4000 A., measured in a cell with a length of 10 cm. A 6% solution of the tablets used as a starting material for the injection molding showed under the same conditions an extinction of 0.27.

The polycarbonate in powdered form without the addition of calcium silicate was compressed into tablets in the same manner and processed into small rods. One of these rods was dissolved in methylene chloride to a 6% solution, which showed an extinction of 0.41 at 4000 A., measured in a cell with a length of 10 cm.

*Example VII*

A polycarbonate in powdered form prepared from 1,1-(4,4'-dihydroxydiphenyl) cyclohexane and phosgene was pressed into a small block in a press heated at 280° C.

The polycarbonate in powdered form was mixed with 1.2% by weight of sodium silicate and subsequently pressed into a small block in the same manner. This block had a considerably lighter color than the block pressed from the polycarbonate to which no sodium silicate had been added. In other experiments with the same polycarbonate in powdered form, a similar effect was obtained each by the addition of 1.5% by weight of sodium silicate, 1.2% by weight of calcium silicate, and 1.6% by weight of strontium silicate.

*Example VIII*

A polycarbonate in powdered form, prepared from 4,4'-dihydroxydiphenyl sulphone and phosgene, was mixed with 2% by weight of barium silicate and subsequently compressed into tablets. The tablets were processed into combs by an injection molding machine.

The polycarbonate in powdered form without the addition of barium silicate was processed into combs in the same manner. These combs had a darker color than the combs manufactured from the polycarbonate mixed with barium silicate.

It can be seen from the foregoing examples that the compounds of this invention stabilize the above-described high molecular weight polycarbonates against the degradative effects of heat.

It should be understood that many modifications or additions may be made in the practice of this invention without departing from the spirit and scope of this invention which is to be limited only by the following claims.

What is claimed is:

1. A polycarbonate stabilized against degradative effects of heat by the addition of a small amount of a silicate of an element selected from the group consisting of lead, zinc, and elements of groups I and II of the periodic system having an electronegativity of not more than 1.0 to said polycarbonate.

2. A polycarbonate stabilized against degradative effects of heat by the addition to said polycarbonates of a silicate of an element selected from the group consisting of lead, zinc, sodium, potassium, rubidium, cesium, calcium, strontium, and barium.

3. A polycarbonate according to claim 1 wherein said element is lead.

4. A polycarbonate according to claim 1 wherein said element is zinc.

5. A polycarbonate according to claim 1 wherein said element is calcium.

6. A polycarbonate according to claim 1 wherein said element is sodium.

7. A polycarbonate according to claim 1 wherein said element is potassium.

8. A polycarbonate according to claim 1 wherein said element is barium.

9. A polycarbonate according to claim 1 wherein said small amount is about 0.001% to about 3.0% by weight based on said polycarbonates.

10. A method for stabilizing polycarbonates against the degradative effect of heat which comprises admixing with said polycarbonates a silicate of an element selected from the group consisting of lead, zinc, and elements of groups I and II of the periodic system having an electronegativity of not more than 1.0.

11. A process according to claim 10 wherein said element is lead.

12. A process according to claim 10 wherein said element is zinc.

13. A process according to claim 10 wherein said element is calcium.

14. A process according to claim 10 wherein said silicate is admixed in an amount of about 0.001% to about 3.0%, based on the weight of said polycarbonates.

References Cited in the file of this patent
UNITED STATES PATENTS
2,585,609    Wills _____ Feb. 12, 1952